Patented May 19, 1925.

1,538,400

UNITED STATES PATENT OFFICE.

WILHELM HERZBERG, OF BERLIN-WILMERSDORF, GERHARD HOPPE, OF BERLIN-TREPTOW, AND HEINRICH OHLENDORF, OF BERLIN-FRIEDENAU, GERMANY, ASSIGNORS TO ACTIEN GESELLSCHAFT FÜR ANILIN FABRIKATION, OF BERLIN, GERMANY.

HALOGENATED NAPHTHAZINE DYES.

No Drawing. Application filed August 22, 1924. Serial No. 733,658.

*To all whom it may concern:*

Be it known that we, WILHELM HERZBERG, GERHARD HOPPE, and HEINRICH OHLENDORF, citizens of the German Republic, residing at Berlin-Wilmersdorf, Germany, Berlin-Treptow, Germany, and Berlin-Friedenau, Germany, have invented certain new and useful Improvements in Halogenated Naphthazine Dyes, of which the following is a specification.

By this invention the products obtained by fusing 8-sulfonic acid derivatives of a naphthazine of the general formula

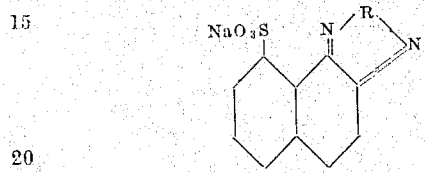

(R meaning an aryl residue) with alkalies furnish valuable dyestuffs when treated with halogenating agents; the products of reaction containing at most four atoms of halogen. The invention may be illustrated by the following examples:—

Example 1. 5 parts of the product obtained by fusing 1.2-naphthophenazine-8-sulfonic acid with an alkali are dissolved in 100 parts of nitrobenzene at a temperature of 50° C. To the solution 8 parts of sulfuryl chloride are slowly added. The reaction having come to an end, the nitrobenzene is distilled with steam. A trichloro-derivative is obtained in this manner which crystallizes in the form of yellow needles, dissolves in concentrated sulfuric acid to a blue solution and is decomposed at a temperature of about 250° C. When heated in an alkaline solution of hydrosulfite it forms a yellow vat, from which cotton is dyed golden yellow tints, which become brighter after chlorination and are very fast to light.

Example 2. 5 parts of the parent material used in Example 1 are dissolved in 100 parts of nitrobenzene. Whilst stirring, 10 parts of bromine are allowed to run slowly into the solution at a temperature of 100° C. To finish the reaction the solution is heated to 130° C. After distilling the nitrobenzene with steam the tribromo-compound is obtained in the form of brownish yellow needles, dissolving in concentrated sulfuric acid to a blue solution and melting at about 300° C. In a finely subdivided state the dyestuff may be applied as a pigment; it has a golden yellow colour and is very fast to the action of light.

Example 3. 32 parts of the product of reaction obtained by fusing 1.2.1'.2'-dinaphthazine-8.8'-disulfonic acid with an alkali are treated in 50 parts of nitrobenzene with 55 parts of sulfuryl chloride at a temperature of 100° C. the temperature being raised finally to 140° C. After cooling, the product of chlorination separates in form of red needles, and is filtered off. It dissolves in concentrated sulfuric acid to a blue solution: it is insoluble in a solution of sodium hydroxide and soluble in slight degree in an alkaline solution of hydrosulphite.

By substituting in the foregoing example for the sulfuryl chloride 70 parts of bromide, a bromo-derivative is obtained which crystallizes in the form of dark red needles; when pulverized it forms a bluish red powder having the same properties as those of the product described in Example 3.

If in the foregoing example the parent material is sulfonated before halogenation and the sulfonic acid or acids are treated in an aqueous solution with halogen, the latter is substituted for the sulfonic acid groups.

What we claim is,—

1. A halogenated product containing at most four halogen atoms derived from a compound made by fusing an 8-sulfonic acid of a naphthazine of the general formula:

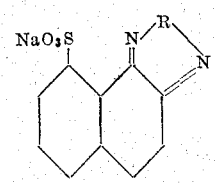

(R meaning an aryl residue) with an alkali.

2. A halogenated product containing at most four halogen atoms derived from a compound made by fusing an 8-sulfonic acid of a dinaphthazine of the general formula

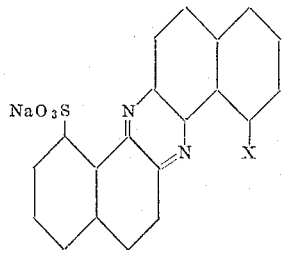

(X meaning an univalent radical) with an alkali.

3. A halogenated product containing at most four halogen atoms derived from the compound made by fusing 1.1'.2.2'-dinaphthazine-8.8'-disulfonic acid with an alkali.

4. The new dye made by introducing four atoms of bromine into the compound made by fusing 1.1'.2.2'-dinaphthazine-8.8'.-disulfonic acid with alkali.

In testimony whereof we affix our signatures in presence of two witnesses.

WILHELM HERZBERG.
GERHARD HOPPE.
HEINRICH OHLENDORF.

Witnesses:
 FRED INDEN,
 ROGER L. AUSPALL.